March 19, 1968

G. B. LONG 3,373,961

SUSPENSION SYSTEM

Filed Dec. 20, 1965

INVENTOR.
GEORGE B. LONG
BY
J.C. Evans
ATTORNEY

March 19, 1968    G. B. LONG    3,373,961
SUSPENSION SYSTEM
Filed Dec. 20, 1965    2 Sheets-Sheet 2
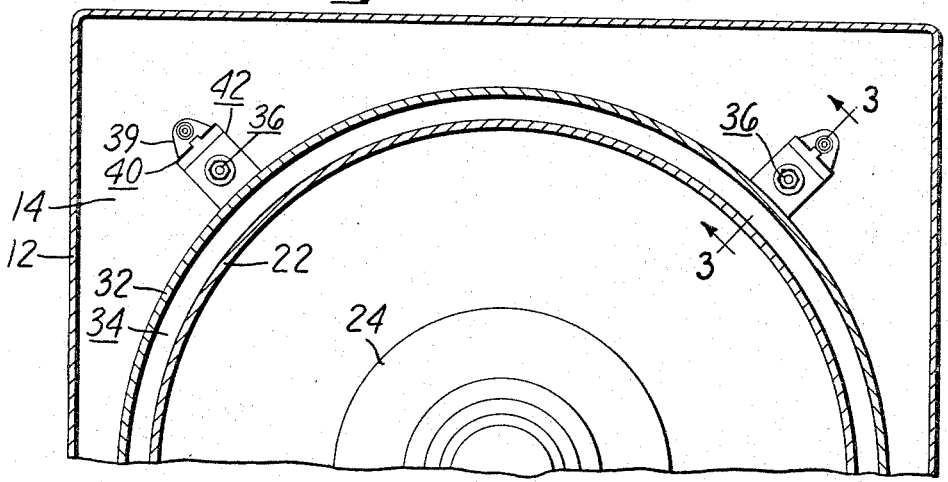
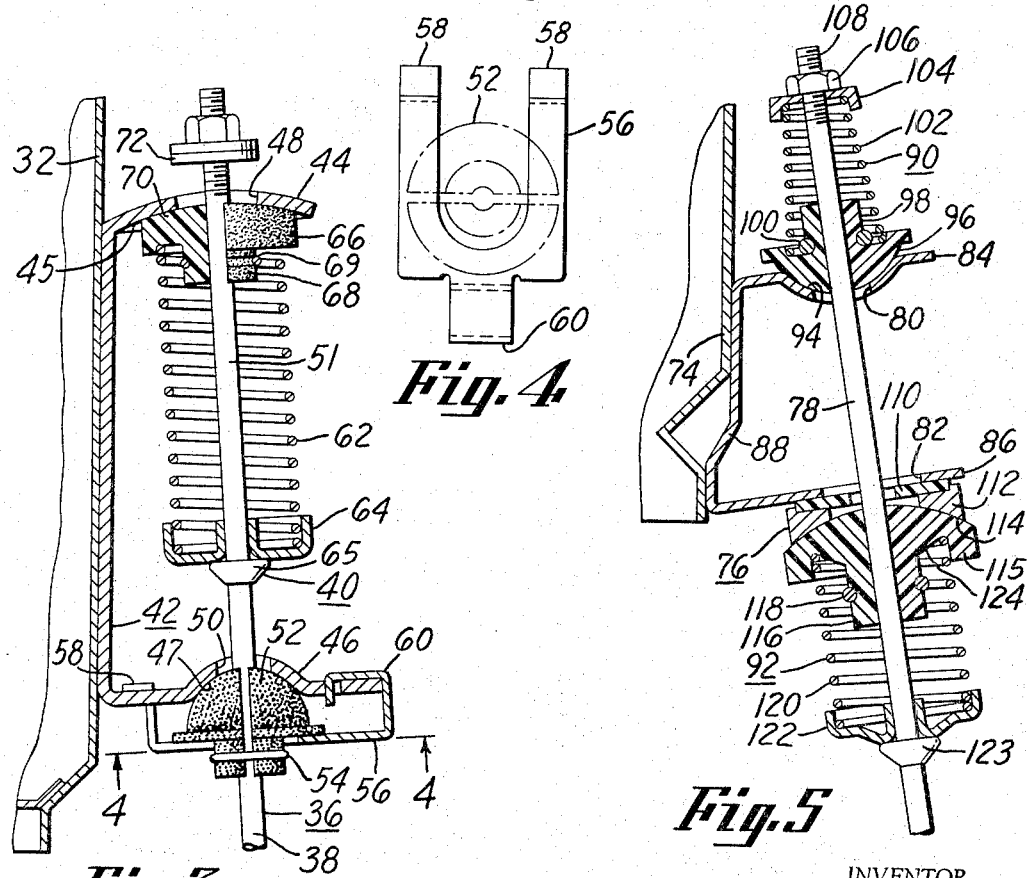
INVENTOR.
GEORGE B. LONG
BY
J. C. Evans
ATTORNEY United States Patent Office 3,373,961
Patented Mar. 19, 1968

3,373,961
SUSPENSION SYSTEM
George B. Long, Dayton, Ohio, assignor to General Motors Corporation, Detroit, Mich., a corporation of Delaware
Filed Dec. 20, 1965, Ser. No. 514,911
8 Claims. (Cl. 248—18)

ABSTRACT OF THE DISCLOSURE

In the preferred form, a suspension system for a domestic washing appliance having a water container in combination with a spin tub and a means to rotate the spin tub, all supported from a base frame by springs on a plurality of supporting rods used in conjunction with plural snubbing devices mounted on each support rod to give a high snubbing restraint at and below critical speed and a lesser restraint above critical speed.

---

This invention is directed to suspension systems and more particularly to a suspension system for isolating vibrations in a movable suspended mass from a fixed support.

In many centrifugal devices a mass is suspended on a fixed support wherein the mass includes a rotatable component operable through a wide range of rotative speeds including a critical speed of operation wherein the suspended mass has a large amplitude movement during one phase of operation and wherein the suspended mass has a reduced amplitude of movement but a substantial dynamic loading during a second mode of operation of the device. For example, in domestic washing machines a spin tub unit is rotatably supported within a water container that is supported on an outer casing and the spin tub is operatively associated with a drive mechanism secured to the water container so as to rotate the spin tub through a critical speed of operation up to a predetermined spin speed wherein water is extracted from the spin tub and discharged into the water container.

In such arrangements, rotation of the spin tub will produce resultant forces on the water container that will cause a relative movement of the water container with respect to the outer casing that will vary in degree depending upon the amount of restraint in the suspension system for supporting the water container within the outer casing. In the operation of such devices, it is desirable to suspend the water container in a manner, first of all, to include a necessary degree of restraint against water container movement that occurs during a critical speed of operation of the spin tub so as to prevent contact between the water container and the outer casing. The suspension system, however, if possible, should have a sufficient built-in flexibility and freedom of movement to prevent an undesirable transfer of dynamic loadings on the water container into the outer casing during high-speed operations of the spin tub wherein an unbalanced load in the spin tub might produce undesirable levels of vibration in the outer casing.

Accordingly, an object of the present invention is to provide a snubbing assembly on a suspended mass portion of a centrifugal device that includes first and second damping means on an elongated upstanding support rod for selectively snubbing both vertical and horizontal movements of the suspended mass with respect to the elongated rod and wherein at least one of the damping means includes a spring element for resiliently and flexibly supporting a predetermined weight of the suspended mass on one of said elongated rods.

Another object of the present invention is to improve suspension systems for isolating vibrations in a centrifugal device from a fixed support by the provision therein of a plurality of suspension units each including an elongated upstanding rod having its opposite ends connected between the centrifugal device and the fixed support and wherein on one end of the rod is located a dual function damping mechanism including a first friction member and first spring means for snubbing vertical movement of the suspended mass with respect to the fixed platform and a second friction member and second spring means for snubbing horizontal movement of the suspended mass with respect to the fixed platform, and wherein the spring means for producing horizontal snubbing movement of the suspended mass with respect to the fixed support serves to direct the weight of the suspended mass into said elongated support rod.

A further object of the present invention is to improve suspension systems for centrifugal devices to isolate unbalanced forces therein from a fixed support by the provision of a plurality of suspension units each including an elongated upstanding rod having one end thereof secured to the fixed support and the opposite end thereof connected through a damping mechanism to the suspended mass and wherein the damping assembly includes a bracket having spaced apart portions thereof with openings therein aligned with one another through which the free ends of the elongated upstanding rod is directed and wherein first and second spaced apart friction members are secured to said rod and located respectively in sliding frictional engagement with said first and second bracket portions to concurrently snub horizontal and vertical movements of the suspended mass with respect to the fixed platform.

Yet another object of the present invention is to provide a suspension system of the type set forth in the preceding object wherein one of the friction members is spring biased against one of said bracket portions by spring means fixedly secured to said rod for directing a portion of the weight of the suspended mass into said rod.

Still another object of the present invention is to provide a suspension system of the type set forth in the preceding object wherein the other of said friction members has a hemispherical surface thereon received in a socket in one of the bracket portions and to include spring means for biasing said hemispherical surface into sliding frictional engagement with said socket to damp vertical movement of the suspended mass with respect to the fixed platform.

Still another object of the present invention is to improve suspension systems for isolating unbalanced forces in a centrifugal device from a fixed supporting platform by the provision of a plurality of suspension units each including an elongated upstanding rod having one end thereof fixedly secured to said fixed platform and the opposite end thereof directed through a snubbing assembly connected to the suspended mass for movement therewith, and wherein the snubbing assembly includes at least one friction member secured to said rod and frictionally engaging a portion of the suspended mass to produce a predetermined snubbing action upon a predetermined relative movement of the suspended mass with respect to the elongated rod.

Further objects and advantages of the present invention will be apparent from the following description, reference being had to the accompanying drawings wherein preferred embodiments of the present invention are clearly shown.

In the drawings:

FIGURE 2 is a view in cross section of a portion of the washer illustrated in FIGURE 1;

FIGURE 3 is an enlarged, fragmentary view in vertical section taken along the line 3—3 of FIGURE 2;

FIGURE 4 is a view in horizontal section taken along the line 4—4 of FIGURE 3; and FIGURE 5 is an enlarged, fragmentary vertical sectional view like FIGURE 3 of another embodiment of the invention.

Figure 1:
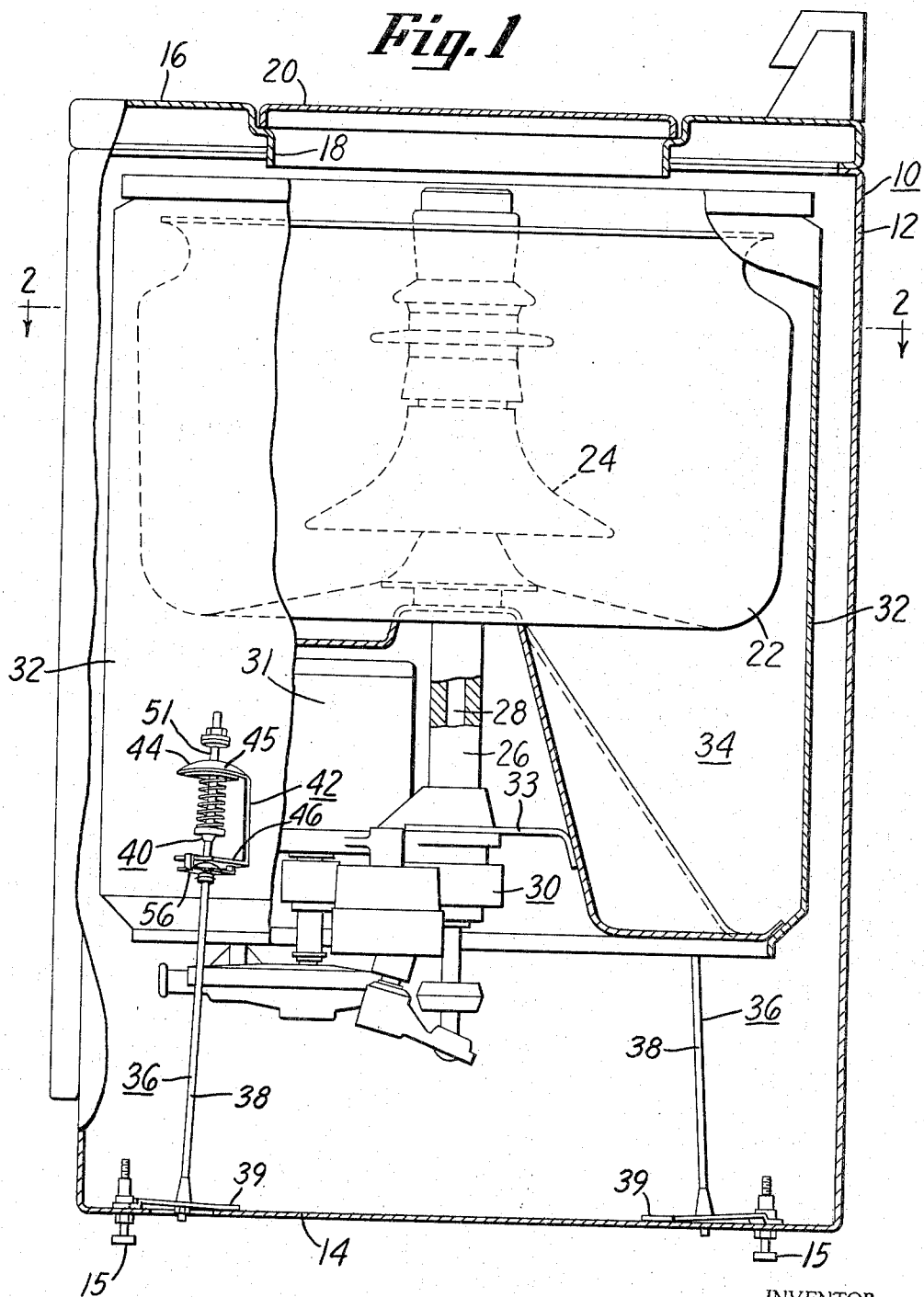
FIGURE 1 shows a domestic clothes washer, partially in section and partially broken away, including the suspension system of the present invention.

Referring now to the drawings, in FIGURE 1 a domestic clothes washer 10 is illustrated that includes an outer casing 12 having a base 14 thereon with adjustable floor engaging feet 15 thereon. The outer casing 12 further includes a top 16 having an access opening 18 therein closed by a door 20. The access opening 18 is aligned with an open upper end of a spin tub 22 in which is located an agitator 24. The spin tub 22 is connected to a spin tub shaft 26 and the agitator 24 is connected to an agitate shaft 28 which are driven by means representatively shown as a friction roller drive mechanism 30 of the type including a reversible electric motor 31 selectively energized by suitable control means (not shown) either to rotate the spin tub 22 or move the agitator 24 relative to the spin tub 22 in a manner more specifically set forth in United States Patent No. 3,087,321, issued Apr. 30, 1963. In the illustrated arrangement the roller drive mechanism 30 is secured by a bracket 33 to the underside of a water container 32 that surrounds the spin tub 22 for receiving water extracted therefrom into a space 34 therein during a spin cycle of operation of the washer 10. The water supply and drain systems for the illustrated system is deleted since it forms no part of the present invention. Reference may be made to the above cited patent for a typical fluid supply arrangement.

In washers of the type illustrated and like centrifugal devices, the spin tub 22, during a spin cycle of operation, passes through a critical speed which generates dynamic forces on the water container 32 that can cause a large amplitude movement of the suspended mass comprising the water container 32, the spin tub 22, the agitator 24, and the drive mechanism 30 with respect to the outer casing 12. In order to prevent undesirable impacting of the water container or like suspended mass on the outer casing 12, it is desirable to suspend the water container 32 with respect thereto by means that will effectively snub such movement in a predetermined fashion to limit movement of the water container 32 within predetermined confines. Also during the operation of the spin tub, once it has passed above its critical speed of operation, the general movements of the water container 32 are relatively stable. During high spin speed extraction, the illustrated arrangement, however, may have substantial dynamic loadings therein that are capable of producing relatively substantial vibrations in the outer casing 12.

In accordance with certain principles of the present invention, in the embodiment of the invention set forth in FIGURES 1 through 4, a suspension assembly 36 is located at each of the corners of the machine to support the water container 32 with respect to the outer casing 12 and is operative both to snub excessive movements of the water container 32 with respect to the outer casing 12 at critical speeds and also to reduce the transfer of unbalanced loadings on the spin tub 22 to casing 12 during high-speed spin operation to prevent excessive vibrations in the casing 12. To accomplish this purpose, each of the suspension assemblies 36 includes an elongated, upstanding rod 38 having one end thereof fixedly secured to a base support plate 39 that is fastened rigidly to the base 14 of the outer cabinet 12 and an upper free end that is directed through a snubber assembly 40 that includes a U-shaped bracket 42 secured to the water container 32 adjacent each of the corners of the casing 12. The U-shaped bracket 42, more particularly, includes an upper outwardly directed arm 44 that is bent downwardly to form a spherical surface 45 thereon facing in the direction of the base 14. Spaced from the arm 44 is a second arm portion 46 of the bracket 42 that is directed outwardly of the water container 32 and formed to have a central downwardly facing socket 47 formed therein.

The arms 44, 46, respectively, include openings 48, 50 that are aligned with one another through which is directed the upper free end 51 of the elongated rod 38.

The assembly 40 further includes a friction member shaped as a hemispherically-shaped split ball 52 that is supported within the socket 47 and has a shank portion thereof secured by a clamp ring 54 to the upper end 51 of the rod immediately above the arm portion 46 in sliding frictional engagement therewith. A bifurcated spring arm 56 underlies the split ball 52 and has ends thereof directed through and bent with respect to the arm 46 at 58 and the opposite end thereof directed through and bent with respect to the arm 46 at 60 to spring bias the ball 52 into sliding frictional engagement with the socket 47 in the arm 46. The ball 52 in the illustrated arrangement is located substantially on the center of gravity of the suspended mass represented by the water container 32 and the components supported thereon whereby unbalanced loadings on the spin tub 22 offset from the center of gravity of the mass will cause the suspended mass represented by the water container 32 to pivot on the ball 52 within the socket 47 to produce a predetermined snubbing of such movement. The spring 56 and ball 52 in the illustrated arrangement will serve to snub vertical movements of the water container 32 with respect to the platform 14 in a variable fashion. More specifically, on downward movement of the container 32, the ball 52 will be pinched between the arm 46 and spring 56 to be forced into greater frictional engagement with the rod 38 and on upward movement of the container 32 the pinching action will be reduced to reduce frictional forces on the rod 38 that might otherwise tend to lift the base 14 from a supporting floor.

Additionally, the damping assembly 40 includes a coil spring 62 that has one end thereof secured to the rod end 51 by a retainer 64 seated on an outwardly flared portion 65 of the rod end 51 and the opposite end thereof seated within a recessed underside of a horizontal friction or snubber disc 66 that has a shank portion 68 thereof secured to the rod portion 51 by a snap ring 69 and a spherically-shaped head portion 70 that is biased by the spring 62 into sliding frictional engagement with the surface 45 on the arm 44 of the bracket 42. On the free end of the rod portion 51 is secured a stop element 72 to limit upward vertical movement of the water container 32 with respect to the base 14.

The snubber disc 66 coacts with the arm 44 upon a predetermined horizontal relative movement between the container 32 and the rod 38 to produce a predetermined horizontal snubbing action against movement of the container 32 with respect to the outer casing 12.

By virtue of the above-illustrated arrangement, when the spin tub 22 passes through a critical speed of operation to produce a large amplitude of movement of the container 32, the representatively shown system has a substantial weight therein represented by the water to be removed during the spin cycle of operation which compresses the spring 62 to produce a substantial force on the snubber disc 66 whereby, as the water container 32 is shifted through a substantial movement with respect to the elongated upstanding rod 38, the arm portion 44 will slide across the snubber disc 66 following a predetermined flexing of the rod 36 whereby a snubbing force is produced to restrain a predetermined undesirable movement of the water container 32. In the illustrated arrangement, the movement of the arm 44 with respect to the snubber disc 66 is relatively large whereby the amount of heat generated during movement of the water container 32 produced by operation of the spin tub 22 through its critical speed will be distributed across the full planar extent of the spherical surface 44 to reduce the temperature increases in the snubbing disc 66 so as to prevent an undesirable deterioration of the frictional snubbing characteristics thereof.

During the operation of the spin tub 22 following the critical speed of operation during which time the spin speed is substantially increased as, for example, to run in the neighborhood of 600 to 750 r.p.m. The excursions of the water container 32 are of a substantially reduced amplitude as compared to those encountered during the critical speed of operation. However, during high spin speed operation, any unbalanced loading in the spin tub 22 will direct substantial dynamic forces into the damping assembly 40 and the elongated rods 38 which desirably are isolated from the outer casing 12 as much as possible to prevent an undesirable build up of vibration therein.

The illustrated damping arrangement 40, while producing substantial snubbing actions against large amplitude movements, will reduce the transfer of substantial dynamic unbalanced loadings in the suspended system into the casing 12 at high spin speed operation since the elongated upstanding rods 38 will flex to take up such forces and, additionally, in the system the springs 62 will yield against low amplitude movements to resiliently support the mass and the snubbing action of the discs 66 and balls 52 will be reduced since the amplitude of movement of water container 32 is reduced relative to the rods 38. Moreover, as the speed of the spin tub 22 increases, snubbing will be reduced since the water will be extracted therefrom and drained from the washer 10 in a conventional fashion to reduce the load on the springs 62 whereby a commensurate reduction in the amount of frictional force between the discs 66 and arms 44 is reduced to reduce the transmissibility of the unbalanced forces in the cabinet or outer casing 12.

In FIGURE 5, another embodiment of an improved suspension system is illustrated that is connected to a lower end of a water container 74 like the water container 32 of the first embodiment. A suspension assembly 76 is shown including an elongated upstanding rod like that shown in the first embodiment having an upper end portion 78 directed through aligned openings 80, 82 in spaced apart arms 84, 86 of a U-shaped bracket 88 secured to the water container 74. The arm 84 forms part of a vertical movement damping system and pivot unit 90 in the assembly 76 and the lower arm 86 forms part of a horizontal and vertical movement snubbing unit 92 in the assembly 76.

The vertical damping unit 90, more particularly, includes a socket 94 formed in the arm 84 around the opening 80 therein in which is received a hemispherically-shaped ball 96 split like the ball 52 in the first embodiment and of a suitable friction producing material. The ball 96 has a shank 98 thereon secured to the rod end 78 by a snap ring 100. A conically-shaped coil spring 102 has one end thereof in engagement with a recessed portion of the ball 96 to bias the hemispherical surface thereon into sliding frictional engagement with the socket 94 in the arm 84, and it further has the opposite end thereof in engagement with a retainer element 104 secured on the free end of the end portion 78. The retainer 104 is adjustable with respect to the rod 78 by a nut 106 threadably adjustable on a threaded end 108 of rod 78 to vary the amount of frictional force produced between the ball 96 and the arm 84. The ball 96 is located substantially on the center of gravity of a suspended mass like that shown in the first embodiment whereby pivotal movement of the suspended mass with respect to the rod end 78 produced by off-center of gravity unbalanced loading on the spin tub in the suspended mass or a like component will cause relative pivotal movement of the ball 96 with respect to the socket 94 to snub such action.

The horizontal and vertical movement snubbing unit 92 includes an annular friction producing disc member 110 that surrounds the rod portion 78 and has one surface thereon slidably engageable with the arm portion 86 about the opening 82 therein. The disc 110 is supported in a retainer element 112 that has a spherical surface 114 on the underside thereof facing the base of the unit to which the lower end of the rod 78 is secured. Within the spherical surface 114 is received a hemispherical split snubber ball 115 that has a shank portion 116 thereof secured to the rod 78 by a clamp ring 118. The ball 115 acts like the ball 52 in the first embodiment to snub vertical movements of container 74. A main system support spring 120 is located about the rod 78 below the snubber member 115 and has one end thereof seated on a retainer element 122 that, in turn, is supported by an outwardly flared portion 123 of the rod portion 78 and has the opposite end thereof seated in a groove 124 in the underside of ball 115. Spring 120 resiliently supports a predetermined portion of the weight of the suspended mass including the water container 74 so that it has freedom of movement at relatively stable high spin speeds. The spring 120 will serve to bias ball 115 into frictional engagement with the retainer 112 and to cause it to force the friction disc 110 into engagement with the arm 86.

In this embodiment of the invention, to prevent undesirable large amplitude movements of the water container 74 during critical speed phases of operation, the combined frictional action of the disc 110 and friction ball 115 will produce a substantial snubbing force of the same order as that produced by the horizontal snubber member 66 in the first embodiment.

While the embodiments of the present invention as herein disclosed constitute preferred forms, it is to be understood that other forms might be adopted.

What is claimed is as follows:

1. A vibration isolation system for association with a centrifugal device such as a domestic washing machine or the like comprising a fixed support, a suspended mass including a rotatable component and means for rotating at least a portion of said mass through a critical speed and a speed in excess of said critical speed, a plurality of elongated upstanding rods having one end thereof secured to said fixed support, a damping means connecting the opposite end of each of said elongated rods to said movable suspended mass whereby said rods are maintained in compression, said damping means including a first snubbing means for snubbing vertical movement of said suspended mass with respect to said fixed support and a second snubbing means for snubbing a predetermined horizontal movement of said suspended mass with respect to said fixed support, said second snubbing means including a friction member secured to the opposite end of said rod, said suspended mass including a portion thereof frictionally engaging said friction member and relatively movable with respect to said friction member, a spring having one end thereof secured to said rod and the opposite end thereof biasing said friction member against said suspended mass portion and operative to direct a predetermined portion of the weight of said suspended mass through said rod, said spring exerting a variable force against said friction member in accordance with changes in the weight of said suspended mass.

2. In the combination of claim 1, said portion of said suspended mass surrounding said rod in spaced relationship therewith, a coil spring surrounding said rod, retaining means on said rod receiving one end of said coil spring, the opposite end of said coil spring engaging said friction member for biasing said friction member against said portion of said suspended member.

3. A vibration isolation system for association with a centrifugal device such as a domestic washing machine or the like comprising a fixed support, a suspended mass including a rotatable component and means for rotating at least a portion of said mass through a critical speed and a speed in excess of said critical speed, a plurality of elongated upstanding rods having one end thereof secured to said fixed support, a damping means connecting the opposite end of each of said elongated rods to said movable suspended mass whereby said rods are maintained in compression, said damping means including a first snubbing means for snubbing vertical movement of said suspended mass with respect to said fixed support and a second snubbing means for snubbing a predetermined horizontal movement of said suspended mass with respect to said fixed support, said suspended mass having a bracket secured thereto including a first portion and a second portion having aligned openings, said rod having its opposite end directed through said aligned openings in spaced relationship with said bracket portions, one of said snubbing means including a first friction member secured adjacent the free end of said opposite end of said rod and in frictional sliding engagement with said first portion of said bracket, the other of said snubbing means including a second friction member secured on said rod in spaced relationship to said first friction member and in sliding frictional engagement with said second portion of said bracket, a first spring means for resiliently biasing said first friction member against said first bracket portion, a second spring means for biasing said second friction block into frictional engagement with said second bracket portion, and one of said spring means being secured to said rod for directing the weight of said suspended mass into said rod.

4. In the combination of claim 3, said first bracket portion having a concave surface thereon facing said fixed support, said first friction member having a convex surface for slidably frictionally engaging said concave surface of said first bracket portion and coacting therewith to produce a substantial snubbing action against horizontal movement of said suspended mass with respect to said fixed support.

5. In the combination of claim 3, said second bracket portion having a socket formed therein around the opening therein, said second friction member having a hemispherical surface thereon seated within said socket, said second spring means including a leaf spring engaging said second friction member to force said hemispherical surface into sliding frictional engagement with said socket for producing a snubbing action against pivotal movement of said suspended mass with respect to said fixed support.

6. In the combination of claim 5, said second friction member being a split ball, said split ball being forced by a first vertical relative movement between said fixed support and said suspended mass into frictional engagement with said rod, said split ball having a lesser frictional engagement with said rod upon movement opposite to said first vertical relative movement.

7. A vibration isolation system for association with a centrifugal device such as a domestic washing machine or the like comprising a fixed support, a suspended mass including a rotatable component and means for rotating at least a portion of said mass through a critical speed and a speed in excess of said critical speed, a plurality of elongated upstanding rods having one end thereof secured to said fixed support, a damping means connecting the opposite end of each of said elongated rods to said movable suspended mass whereby said rods are maintained in compression, said damping means including a first snubbing means for snubbing vertical movement of said suspended mass with respect to said fixed support and a second snubbing means for snubbing a predetermined horizontal movement of said suspended mass with respect to said fixed support, said damping means including bracket means secured to said suspended mass having a first portion and a second portion spaced from said first portion and having aligned openings in said first and second bracket portions, each of said rods being directed through said openings in spaced relationship with each of said first and second bracket portions, said first bracket portion being located beneath the free end of said rod and including a socket therein around said opening therein, said first snubbing means including a friction member having a hemispherical surface seated in said socket and a portion thereof secured to said rod, a first spring having one end thereof connected to the free end of said rod and the opposite end thereof in engagement with said friction member for biasing said hemispherical surface of said friction member into sliding frictional engagement with said socket of said first bracket portion, said second snubbing means including a flat friction disc surrounding said rod in spaced relationship therewith having one surface thereon slidably engaging said second bracket portion, a retainer element for said disc surrounding said rod in spaced relationship therewith, said retainer element having a spherical surface portion thereon, a second friction member having a spherical surface thereon seated in said spherical surface of said retainer for relative frictional sliding movement therewith, means for securing said second friction member to said rod, and a second spring means having one end thereof secured to said rod and the opposite end thereof in engagement with said second friction member for biasing it into frictional engagement with said retainer.

8. In the combination of claim 7, said first friction member being a split ball, said split ball being forced by a first vertical relative movement between said fixed support and said suspended mass into frictional engagement with said rod, said split ball having a lesser frictional engagement with said rod upon movement opposite to said first vertical relative movement.

References Cited
UNITED STATES PATENTS

| | | | |
|---|---|---|---|
| 2,583,579 | 1/1952 | Lodge | 248—18 X |
| 1,766,310 | 6/1930 | Schaum | 248—18 X |
| 2,711,297 | 6/1955 | Thelie | 248—18 |
| 2,748,945 | 6/1956 | Lodge | 210—72 |
| 3,268,082 | 8/1966 | Galin | 210—364 |

JOHN PETO, *Primary Examiner.*